(12) United States Patent
Reddy

(10) Patent No.: US 8,401,882 B2
(45) Date of Patent: Mar. 19, 2013

(54) ALIGNING INFORMATION TECHNOLOGY WITH BUSINESS OBJECTIVES THROUGH AUTOMATED FEEDBACK CONTROL

(75) Inventor: Ashok T. Reddy, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 2307 days.

(21) Appl. No.: 11/164,035

(22) Filed: Nov. 8, 2005

(65) Prior Publication Data

US 2007/0168914 A1    Jul. 19, 2007

(51) Int. Cl.
*G06Q 10/00* (2006.01)
(52) U.S. Cl. ..................... 705/7.11; 705/7.25
(58) Field of Classification Search ........ 705/1
See application file for complete search history.

(56) References Cited

U.S. PATENT DOCUMENTS

| | | | |
|---|---|---|---|
| 5,881,268 A * | 3/1999 | McDonald et al. | 703/21 |
| 6,249,769 B1 * | 6/2001 | Ruffin et al. | 705/7 |
| 6,311,144 B1 * | 10/2001 | Abu El Ata | 703/2 |
| 6,327,551 B1 * | 12/2001 | Peterson et al. | 703/1 |
| 6,990,437 B1 * | 1/2006 | Abu El Ata | 703/2 |
| 7,389,211 B2 * | 6/2008 | Abu El Ata et al. | 703/2 |
| 2002/0128895 A1 * | 9/2002 | Broderick et al. | 705/9 |
| 2003/0130860 A1 | 7/2003 | Datta et al. | |
| 2004/0143470 A1 | 7/2004 | Myrick et al. | |

* cited by examiner

*Primary Examiner* — Candice D Wilson
(74) *Attorney, Agent, or Firm* — Cuenot, Forsythe & Kim, LLC

(57) ABSTRACT

A method of aligning development of an information technology system with business objectives can include obtaining at least one metric relating to a development process for the information technology system and comparing the at least one metric with at least one quantified business objective relating to the information technology system to determine a delta between the at least one metric and the quantified business objective(s). The at least one metric can include a measure of complexity of the information technology system and the business objective(s) can specify a complexity threshold. The method further can include selectively increasing, according to the delta, an amount of at least one resource assigned to the information technology system.

20 Claims, 2 Drawing Sheets

ALIGNING INFORMATION TECHNOLOGY WITH BUSINESS OBJECTIVES THROUGH AUTOMATED FEEDBACK CONTROL

FIELD OF THE INVENTION

The present invention relates to software and/or information technology (IT) development and operations and, more particularly, to managing the development and/or maintenance of IT systems in a manner that better conforms to business objectives.

DESCRIPTION OF THE RELATED ART

Traditionally, information technology (IT) decisions and investment within an organization have occurred largely as a result of analyzing each IT project on an individual basis. That is, each IT endeavor has been viewed independently of other IT projects in terms of cost, man hours required, and the like. Not until the end of a business reporting cycle, for example at the end of a fiscal year, were IT projects reviewed collectively as a whole. Moreover, not until the end of such business reporting periods were IT projects reviewed even on an individual basis to determine whether the project, in fact, met the business needs of the organization.

Recently, businesses have begun to focus attention on whether a given IT project actually serves the business needs of the organization. A field known as Project Portfolio Management (PPM) has arisen to deal with these issues. PPM seeks to select and prioritize IT investment within an organization with the goal of aligning IT investment and people with corporate strategy. By doing so, increased business value can be created. In practice, PPM attempts to organize a series of IT projects into a single portfolio consisting of reports that capture project objectives, costs, timelines, accomplishments, resources, risks, and other critical factors. Executives regularly review entire portfolios, spread resources appropriately, and adjust IT projects to produce the highest departmental returns.

While PPM provides a different way of viewing IT projects, one criticism has been that PPM, like other conventional approaches to IT management, focuses too heavily on subjective business and/or financial data. Objectives typically are set in terms of cost and schedule. The objectives then are communicated to personnel for implementation. As development progresses, however, gaps can develop between implementation strategy and business objectives. The subjective data that is collected and analyzed does not adequately reflect many of the realities of the software development process such as risks relating to the architecture of the IT system, system defects, complexity, rate of change in the code, and the like.

Further, existing PPM systems rely upon human intervention and perception of the status of an IT project to determine whether to adjust resources as well as the degree to which such resources should be adjusted to meet established business objectives. Such decisions are difficult, however, given the subjective nature of the data that is collected. Moreover, it is often the case that little or no feedback exists between the operations level and upper-level management charged with managing a given IT project.

It would be beneficial to provide a solution which provides an automated solution for ensuring that IT projects are aligned with business objectives which overcomes the limitations described above.

SUMMARY OF THE INVENTION

The present invention provides a method and apparatus for aligning development of an information technology (IT) system with business objectives. One embodiment of the present invention can include storing at least one metric for an IT system, wherein the at least one metric comprises a measure of complexity of the information technology system. The at least one metric can be compared with at least one quantified business objective relating to the IT system to determine a delta between the at least one metric and the at least one quantified business objective. The metric can specify a complexity threshold. The method further can include selectively increasing, according to the delta, an amount of at least one resource assigned to the development process for the IT system. An indication of the increase in the amount of the at least one resource can be provided.

Another embodiment of the present invention can include a system for aligning a development process for an IT system with established business objectives. The system can include one or more measurement systems configured to collect at least one metric relating to the development process for the IT system, wherein the at least one metric comprises a measure of complexity of the information technology system, and a comparator configured to compare the collected at least one metric from the measurement system(s) with the established business objectives to determine a measure of convergence, wherein the established business objective specifies a complexity threshold. The system further can include a controller configured to selectively and automatically increase, according to the measure of convergence, an amount of at least one resource assigned to the development process.

Another embodiment of the present invention can include a machine readable storage, having stored thereon, a computer program having a plurality of code sections executable by a machine for causing the machine to perform the various steps and methods disclosed herein.

BRIEF DESCRIPTION OF THE DRAWINGS

There are shown in the drawings, embodiments which are presently preferred; it being understood, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention provides a solution for aligning development efforts relating to an information technology (IT) project and/or system implemented by an organization having established, or defined, business objectives. In accordance with the inventive arrangements disclosed herein, metrics obtained from a software development process for the IT system can be compared with established business objectives of the organization. As used herein, a software development process can refer to development and/or IT system maintenance efforts. The business objectives may relate directly or indirectly to the IT system being developed. By comparing the metrics with the business objectives, a delta, or divergence, between the two can be determined.

Based upon that divergence, also referred to as an error signal, one or more variables relating to the software development process can be regulated. The present invention allows variables, which can represent resources, to be regulated and/or managed in an automated fashion. By employing a feedback loop between a controller charged with regulating the variables and the software development process(es), the inventive arrangements continually seek to reduce the divergence between the metrics and the business objectives to facilitate the achievement of the established business objectives.

Figure 1:
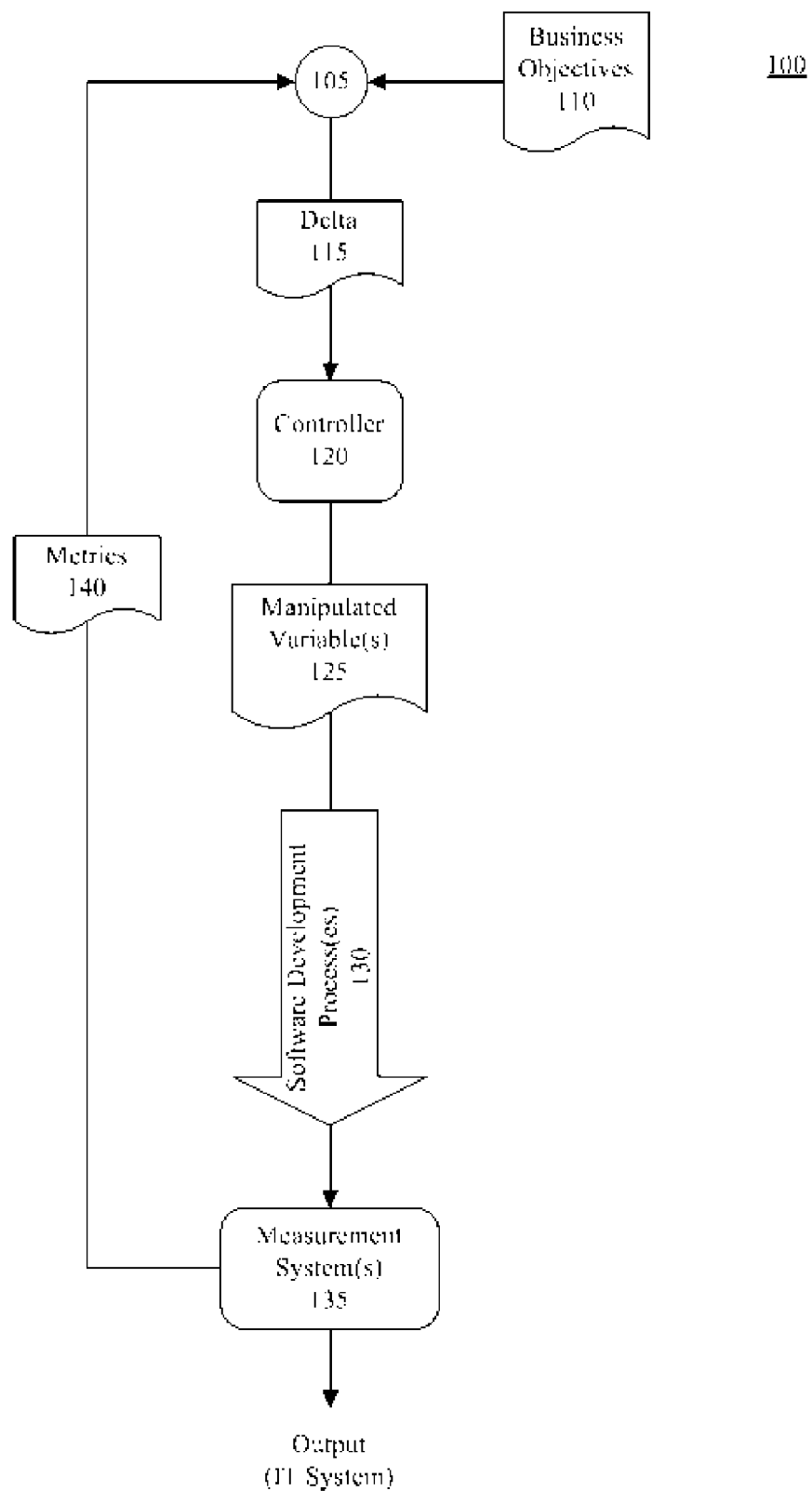
FIG. 1 is a schematic diagram illustrating a system for aligning developmental efforts relating to an information technology system with business objectives in accordance with one embodiment of the present invention.

FIG. 1 is a schematic diagram illustrating a system 100 for aligning developmental efforts relating to an IT system with business objectives in accordance with one embodiment of the present invention. As shown, system 100 can include a comparator 105, a controller 120, and one or more measurement systems 135. In general, business objectives 110 define target values, or levels, for selected, measurable quantities relating to the software development process(es) 130. The software development process(es) 130 refer to the process of creating one or more IT projects and/or systems. If business objectives 110 are maintained at target levels throughout the software development process(es) 130, a strong likelihood exists that the resulting IT system(s) will meet or exceed expectations delineated by the organization.

As noted, business objectives 110 can be measurable quantities pertaining to one or more of the software development processes 130. In one embodiment of the present invention, business objectives 110 can be taken from aspects of software development including, but not limited to, business and/or financial, software lifecycle analysis, testing, and the like. Examples of business and/or financial objectives can include, but are not limited to, a measure of return on investment for an IT system under development, whether the development process for the IT system is on schedule, or whether the development process for the IT system is on budget. Examples of software lifecycle objectives can include, but are not limited to, measures of complexity of the IT system being developed, attributes of the team developing the IT system in terms of skill and/or expertise, etc. In any case, it should be appreciated that a business objective can be a measure of a single quantity or can be a more complex evaluation, or calculation, predicated upon a plurality of individual quantities.

Metrics 140 are similar to business objectives 110 in that metrics 140 can provide indicators, or measures, for one or more measurable quantities relating to the software development process(es) 130. Unlike business objectives 110, however, metrics 140 are determined directly from measurement tools used, or inserted within, the software development process(es) 130. Thus, while business objectives 110 provide a goal or ideal to which a software development process 130 aspires, metrics 140 provide measures of what is actually taking place day-to-day in the software development process (es) 130.

With respect to system 100, the comparator 105 can be configured as a software module executing within a suitable information processing system. The comparator 105 compares one or more business objectives 110 with one or more metrics 140 to determine a delta 115. In one embodiment, delta 115 can be a single quantity reflecting the difference between a particular business objective 110 and a corresponding metric 140. In another embodiment, delta 115 can relate to a plurality of quantities, thereby reflecting the difference between a plurality of business objectives 110 and corresponding metrics 140. In any case, delta 115 provides a measure of the divergence between the business objectives 110, which define the business strategy, and the progress or implementation of actual IT systems.

The controller 120 also can be implemented as a computer program executing within a suitable information processing system. The controller 120, in general, can eliminate, or at least reduce, the need for continuous human operator control or attention to one or more of the software development processes 130. The controller 120 interprets delta 115 determined by comparator 105. The controller 120 applies programming logic to identify and regulate one or more variables of the development process(es) 130 based upon an interpretation of delta 115.

As used herein, a variable can refer to a resource, or a parameter of a resource, of a software development process 130. Such resources already may be in use within a software development process or may be as yet unused, but available for use. For example, a resource can be a software developer, test personnel, a Web service that may be invoked, or the like. A resource also can include testbed time, an amount of money available for a particular task in the development process, or the like. In any case, the controller 120, based upon an interpretation and/or analysis of delta 115 through application of programming logic, can add resources, remove resources, increase an amount of a resource dedicated to a software development process, decrease an amount of a resource devoted to a software development process, and/or otherwise regulate resources for use during a given software development process. Accordingly, controller 120 provides one or more manipulated variables 125 as output which are fed into the business process(es) 130.

In illustration, if examination of delta 115 by application of programming logic indicates that additional personnel are needed who have a specific expertise, the controller 120 automatically can take one or more programmatic actions. For example, by interacting with a human resource database or other data store including a listing of personnel and profile information, controller 120 can select one or more individuals having skills deemed as being necessary to further the development efforts of a particular IT system. The controller 120 can cause a message, such as an electronic mail, an instant message, or the like, to be sent to identified individuals indicating that the individual has been assigned to a particular software development effort. In another embodiment, the controller 120, if desired, can cause a message to be sent to a manager asking that one or more employees under the supervision of that manager be assigned to a particular software development process 130.

The controller 120 further can regulate variables across a plurality of software development processes 130. For example, if an individual having expertise in field A is needed on an IT project X, the controller 120 can select, from an appropriate database, an individual having skill A who is available. If no such developers are available, an individual having skill A can be pulled from another IT project Y that is deemed to be less important than IT project X as specified in the established business objectives 110.

The measurement systems 135 can collect metrics 140 from the software development process(es) 130. A variety of different measurement systems 135 can be used to track and/or monitor the software development process(es) 130. In one embodiment, for example, one or more of the following commercially available products from International Business Machines Corporation of Armonk, N.Y. (IBM) can be used: IBM Rational Rose, IBM Rational Rose XDE, IBM Websphere Studio, IBM Rational TestManager, IBM Rational PurifyPlus, IBM Rational ClearCase, and/or IBM Rational ClearQuest can be used. Products such as IBM Rational Portfolio Manager and IBM Rational ProjectConsole, which also are commercially available from IBM, can be used to implement a centralized clearing house for gathering and/or collecting the various metrics collected from the aforementioned development tools.

While particular software development tools have been noted, it should be appreciated that the present invention is not intended to be limited by the use of any one measurement system. The particular software development products noted above have been noted for purposes of illustration only. As such, it should be appreciated that any of a variety of different software development tools can be employed to capture desired metrics. In any case, the metrics 140 that can be utilized in system 100 can be collected in an automated fashion through the use of various software development tools, in a manual fashion where personnel enter data, and/or through the use of other systems.

Examples of metrics that can be collected for a software development process can include, but are not limited to, defect density, test coverage, defect containment (i.e. test effectiveness), customer reported defects including parameters such as arrival vs. fix rate, and requirements such as satisfied planned vs. actual. Customer reported defects, for example, also can be sorted by priority. Other metrics can provide an indication of quality. These metrics can include, but are not limited to, change traffic and stability over time, breakage and modularity such as the average breakage per change to the IT system over time, rework and adaptability (i.e. trend), and mean time between failure (MTBF) and maturity which is the defect rate over time.

Further examples of metrics that can be collected can include, but are not limited to, complexity of the IT system(s) being developed, the composition of different software development teams, and the like. Regarding complexity, for example, a measurement system 135 can be configured to calculate a measure of cyclomatic complexity. Cyclomatic complexity, often referred to as program complexity, is a broad measure of soundness and confidence for a program. Cyclomatic complexity is described in McCabe, Thomas J. & Watson, Arthur H., "Software Complexity", Crosstalk, Journal of Defense Software Engineering 7, 12 (December 1994): 5-9. In general, cyclomatic complexity measures the number of linearly-independent paths through a program module. As such, it provides a single ordinal number that can be compared to the complexity of other programs or benchmarks, i.e. business objectives. Cyclomatic complexity is intended to be independent of the computer programming language used and the format of the computer programming language.

With respect to team composition, for example, a measurement system 135 can determine which professionals are working on a particular software development process 130. Each professional can be associated with a profile maintained within a personnel management database that is communicatively linked with the controller 120. Thus, a business objective can specify that to maintain budget, for example, a development team should include a particular number of members having designated areas of expertise or members having at least a minimum amount of experience, whether that experience relates to development, leadership, management, or the like. For example depending upon the interpretation of delta 115, controller 120 can assign additional resources in terms of personnel having specific areas of expertise to designated software development projects. Such personnel can be selected based upon available or stored profile information.

In illustration, if the complexity metric for an IT project is above a defined threshold, the controller 120 can alert management, for example, that the complexity of the IT system being developed is too high or is approaching an upper limit. Alternatively, or in combination, the controller 120 can reallocate higher skilled developers to the project with the intention of reducing and/or otherwise controlling the complexity level of the IT system being developed.

Another illustration is where the controller 120 monitors a defect glide path, which is a measure of the number of defects found, fixed, and validated per time interval. The controller 120 can assess whether the software development process is progressing or converging toward quality code based upon a comparison of metrics 140 with the business objectives 110. If not, the controller 120 can take a predetermined or programmed action such as notifying management, adding resources, reallocating developers having specific skills, or reduce the scope of the software development process by lowering the expectations or business objectives.

It should be appreciated that while a variety of different metrics have been discussed, additional metrics also can be incorporated into the embodiments disclosed herein. Additional metrics, for example, can be found in different professional journals relating to software development and/or project management. Such metrics are within the scope of the embodiment disclosed herein. Further, one or more metrics can be combined to determine a different metric which is a hybrid the plurality of underlying metrics. In illustration, a metric for risk can be introduced. Risk can be defined within the controller 120 as a combination of one or more other metrics including, but not limited to, inherent schedule flaws, lack of skilled resources on a project, scope and/or requirements creep, poor productivity, and/or complexity.

In any case, while system 100 can be used to track and regulate a software development process relating to a single IT system, it further can track and/or regulate multiple IT projects simultaneously. In such an embodiment, system 100 can selectively regulate and/or allocate variables between different software development processes 130 as may be required depending upon priorities indicated by the business objectives 110. That is, priority can be given to one IT project over another based upon defined business objectives. Accordingly, resources can be regulated and/or managed among the various IT projects as may be required.

Figure 2:
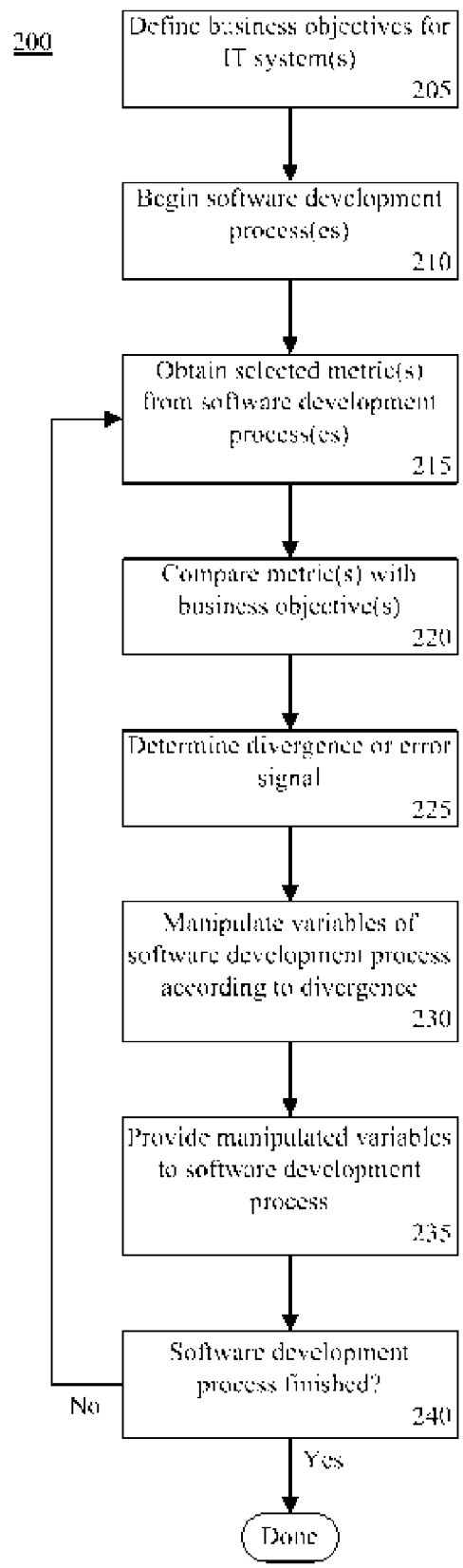
FIG. 2 is a flow chart illustrating a method of aligning information technology system development with business objectives in accordance with another embodiment of the present invention.

FIG. 2 is a flow chart illustrating a method 200 of aligning information technology system development with business objectives in accordance with another embodiment of the present invention. Method 200 can be implemented by a system as described with reference to FIG. 1. Accordingly, method 200 can begin in step 205 where one or more business objectives can be quantified or defined. As noted, the business objectives can include, but are not limited to, measurable quantities such as return on investment for a particular IT system or a group of IT systems, complexity of an IT system, etc. In one embodiment, for example, a business objective can be a measure of quality which is calculated using one or more variables relating to complexity, process, personnel, or the like.

In step 210, the software development process can be started. In step 215, software development tools can begin collecting metrics pertaining to the software development process(es). These metrics can be collected automatically, or generated automatically from information obtained by, or entered into, various software development systems and/or measurement systems as the case may be. In step 220, the metrics can be compared with the business objectives. For example, the collected metrics can be used to compute a measure of quality for the IT system at a particular stage of development. The measure of quality can be compared with the measure of quality specified in the business objective(s).

In step 225, a divergence, or error signal, between the metrics and the business objective(s) can be calculated. The divergence, or error signal, can be provided to a controller. In step 230, the controller can manipulate one or more variables, or parameters of variables, of the software development process according to the error signal. More particularly, programming logic can be applied to the error signal. The programming logic can select and/or indicate which programmatic action(s) can be performed and/or executed automatically by the controller. That is, the programming logic can select one or more variables to be manipulated and the manner in which such variables are to be manipulated. As noted, manipulation and/or regulation of a variable effectively can result in adding resources to a software development process, removing resources from a software development process, increasing an amount of a resource being applied to a software development process, or reducing an amount of a resource being applied to a software development process.

In step 235, the manipulated variables, i.e. resources, can be provided to the software development process as input. In step 240, a determination can be made as to whether the software development process is finished. This can be a manual determination or can be made automatically when the divergence between the defined business objective(s) and the metric(s) is less than a predetermined amount. In any case, if the development process is finished, the method can end. If not, the method can continue to step 215 to continue processing as may be required. The loop-back to step 215, in addition to the measure of divergence, introduce feedback to prevent the development process(es) from moving too far astray of defined business objectives.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of aligning development of an information technology system with business objectives comprising:
    storing at least one metric for the information technology system, wherein the at least one metric comprises a measure of complexity of the information technology system;
    comparing, via a processor, the at least one metric with at least one quantified business objective relating to the information technology system to determine a delta between the at least one metric and the at least one quantified business objective, wherein the at least one quantified business objective specifies a complexity threshold;
    selectively increasing, according to the delta, an amount of at least one resource assigned to the development process for the information technology system; and
    providing an indication of the increase in the amount of the at least one resource.

2. The method of claim 1, wherein the resource already is associated with the development process, the method further comprising adjusting a parameter of the resource according to the delta.

3. The method of claim 1, wherein the resource already is associated with the development process, the method further comprising disassociating the resource from the development process.

4. The method of claim 1, wherein the resource has not yet been associated with the development process, the method further comprising assigning the resource to the development process.

5. The method of claim 1, wherein the at least one metric comprises a measure of return on investment for the information technology system.

6. The method of claim 1, wherein the at least one metric comprises a measure of risk for the information technology system.

7. The method of claim 1, wherein the at least one resource is staffing, the method further comprising selectively assigning at least one additional developer to the development process according to the delta and a skill level associated with each developer assigned to the development process.

8. The method of claim 7, further comprising sending a notification to an address of the at least one additional developer assigned to the development process.

9. A machine readable storage, having stored thereon a computer program having a plurality of code sections that, when executed by a computer, cause the computer to perform a plurality of steps, the machine readable storage comprising:
   code for collecting and storing at least one metric for a development process for an information technology system, wherein the at least one metric comprises a measure of complexity of the information technology system;
   code for comparing the at least one metric with at least one quantified business objective relating to the information technology system to determine a delta between the at least one metric and the at least one quantified business objective, wherein the at least one quantified business objective specifies a complexity threshold; and
   code for selectively increasing, according to the delta, an amount of at least one resource assigned to the development process for the information technology system.

10. The machine readable storage of claim 9, wherein the resource already is associated with the development process, the machine readable storage further comprising code for adjusting a parameter of the resource according to the delta.

11. The machine readable storage of claim 9, wherein the resource already is associated with the development process, the machine readable storage further comprising code for disassociating the resource from the development process.

12. The machine readable storage of claim 9, wherein the resource has not yet been associated with the development process, the machine readable storage further comprising code for assigning the resource to the development process.

13. The machine readable storage of claim 9, wherein the at least one metric comprises a measure of return on investment for the information technology system.

14. The machine readable storage of claim 9, wherein the at least one metric comprises a measure of risk for the information technology system.

15. The machine readable storage of claim 9, wherein the at least one resource is staffing, the machine readable storage further comprising code that selectively assigns at least one additional developer to the development process according to the delta and a skill level associated with each developer assigned to the process.

16. The machine readable storage of claim 15, further comprising code for sending a notification to an address of the at least one additional developer assigned to the development process.

17. A system for aligning development of an information technology system with business objectives, the system comprising:
   a computer system programmed to perform executable operations comprising:
   storing at least one metric for the information technology system, wherein the at least one metric comprises a measure of complexity of the information technology system;
   comparing the at least one metric with at least one quantified business objective relating to the information technology system to determine a delta between the at least one metric and the at least one quantified business objective, wherein the at least one quantified business objective specifies a complexity threshold;
   selectively increasing, according to the delta, an amount of at least one resource assigned to the development process for the information technology system; and
   providing an indication of the increase in the amount of the at least one resource.

18. The system of claim 17, wherein the resource already is associated with the development process, the method further comprising adjusting a parameter of the resource according to the delta.

19. The system of claim 17, wherein the resource already is associated with the development process, the method further comprising disassociating the resource from the development process.

20. The system of claim 17, wherein the resource has not yet been associated with the development process, the method further comprising assigning the resource to the development process.

* * * * *